United States Patent
Benabbou et al.

(10) Patent No.: US 11,280,922 B2
(45) Date of Patent: Mar. 22, 2022

(54) STRUCTURAL VOLUME SEGMENTATION

(71) Applicant: Schlumberger Technology Corporation, Sugar Land, TX (US)

(72) Inventors: Azeddine Benabbou, Montpellier (FR); Arnaud Levannier, Montpellier (FR); Colin Daly, Abingdon (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 435 days.

(21) Appl. No.: 16/308,786

(22) PCT Filed: Jun. 8, 2016

(86) PCT No.: PCT/IB2016/000942
§ 371 (c)(1),
(2) Date: Dec. 10, 2018

(87) PCT Pub. No.: WO2017/212305
PCT Pub. Date: Dec. 14, 2017

(65) Prior Publication Data
US 2019/0146109 A1 May 16, 2019

(51) Int. Cl.
G01V 1/28 (2006.01)
G01V 99/00 (2009.01)
G06F 17/16 (2006.01)

(52) U.S. Cl.
CPC ............ G01V 1/282 (2013.01); G01V 99/005 (2013.01); G06F 17/16 (2013.01); *G01V 2210/66* (2013.01)

(58) Field of Classification Search
CPC .. G01V 2210/66; G01V 1/282; G01V 99/005; G01V 1/302; G01V 1/345;
(Continued)

(56) References Cited

U.S. PATENT DOCUMENTS 8,838,419 B2 * 9/2014 Sullivan ............. G05B 19/4069
703/1
9,536,022 B1 * 1/2017 Tertois .................... G06F 30/20
(Continued)

FOREIGN PATENT DOCUMENTS

EP 1070267 A1 1/2001

OTHER PUBLICATIONS

Quan et al. "Modeling merging and breakup in the moving mesh interface tracking method for multiphase flow simulations". Journal of Computational Physics 228 (2009). pp. 2660-2675. (Year: 2009).*
(Continued)

*Primary Examiner* — Eunhee Kim

(57) ABSTRACT

A method for performing a field operation of a field. The method includes identifying, inside a volume of interest representing a portion of the field, that a first surface segment is truncated by a second surface segment, where each of the first surface segment and the second surface segment corresponds to a geological feature in the field, generating, based at least on a first implicit function, an extended first surface segment that includes the first surface segment and a first extension of the first surface segment, generating a number of compartments by dividing the volume of interest using at least the extended first surface segment and the second surface segment, merging, based on a common boundary of at least two of the compartments being within an invalid portion of the extended first surface segment, the at least two compartments into a single merged compartment, and performing, based at least on the single merged compartment, modeling of the field to generate a modeling result.

15 Claims, 8 Drawing Sheets

(58) Field of Classification Search
CPC ............... G01V 1/301; G01V 2210/65; G01V 2210/64; G01V 2210/661; G01V 2210/642; G01V 2210/643; G01V 2210/665; G06F 17/16; G06F 30/20; G06F 17/05; G06F 17/20; G06F 17/205

See application file for complete search history.

(56) References Cited

U.S. PATENT DOCUMENTS

| | | | | |
|---|---|---|---|---|
| 10,083,264 | B1* | 9/2018 | Orbay | G06F 30/17 |
| 2007/0168169 | A1* | 7/2007 | Neave | G06T 17/05 |
| | | | | 703/10 |
| 2009/0248374 | A1* | 10/2009 | Huang | G01V 11/00 |
| | | | | 703/2 |
| 2012/0022837 | A1* | 1/2012 | Asbury | G06T 17/05 |
| | | | | 703/2 |
| 2013/0246031 | A1* | 9/2013 | Wu | G06F 30/20 |
| | | | | 703/10 |
| 2013/0262052 | A1* | 10/2013 | Mallet | G01V 1/302 |
| | | | | 703/2 |
| 2015/0066460 | A1* | 3/2015 | Klinger | G01V 99/005 |
| | | | | 703/2 |
| 2018/0031719 | A1* | 2/2018 | Huang | G01V 99/005 |

OTHER PUBLICATIONS

International Preliminary Report on Patentability for the equivalent International patent application PCTIB2016/000942 dated Dec. 20, 2018.

Communication pursuant to Article 94(3) for European patent application 16748344.5 dated Oct. 14, 2019.

Beucher et al., "Use of Watersheds in Contour Detection," International Workshop on Image Processing, Sep. 17-21, 1979, pp. 2.1-2.12.

Beucher et al., "The Morphological Approach to Segmentation: The Watershed Transformation," Mathematical Morphology in Image Processing, 1993, pp. 433-481.

Beucher, "The Watershed Transformation Applied to Image Segmentation," Signal and Image Processing in Microscopy and Microanalysis, 1991, pp. 1-26.

Haumont et al., "Volumetric Cell-And-Portal Generation," Eurographics, 2003, vol. 22, No. 3, 10 pages.

Mangan et al., "Partitioning 3D Surface Meshes Using Watershed Segmentation". In IEEE Transactions on Visualization And Computer Graphics, vol. 5, No. 4, Oct.- Dec. 1999, pp. 308-321.

Meyer, "An overview of morphological segmentation," International Journal of Pattern Recognition and Artificial Intelligence, 2001, vol. 15, No. 7, pp. 1089-1118.

Meyer, "Topographic distance and watershed lines," Signal Processing, vol. 38, 1994, pp. 113-125.

Roerdink et al., "The Watershed Transform: Definitions, Algorithms and Parallelization Strategies," Fundamenta Informaticae, vol. 41, 2001, pp. 187-228.

Sijbers et al., "Watershed-based Segmentation of 3D MR Data for Volume Quantization," Magnetic Resonance Imaging, vol. 15, No. 6, 1997, pp. 679-688.

Souche, et al., "Construction of Structurally and Stratigraphically Consistent Structural Models Using the Volume-Based Modelling Technology: Applications to an Australian Dataset," International Petroleum Technology Conference, Dec. 10, 2014, pp. 1-12.

Souche, et al., "Volume Based Modeling—Automated Construction of Complex Structural Models Introduction," 75th EAGE Conference & Exhibition Incorporating SPE Europec 2013, Jun. 10, 2013.

Vincent et al., "Watersheds in Digital Spaces: An Efficient Algorithm Based on Immersion Simulations," IEEE Transactions on Pattern Analysis and Machine Intelligence, vol. 13, No. 6, Jun. 1991, pp. 583-598.

International Search Report and Written Opinion for the equivalent International patent application PCTIB2016/000942 dated Jul. 2, 2017.

* cited by examiner

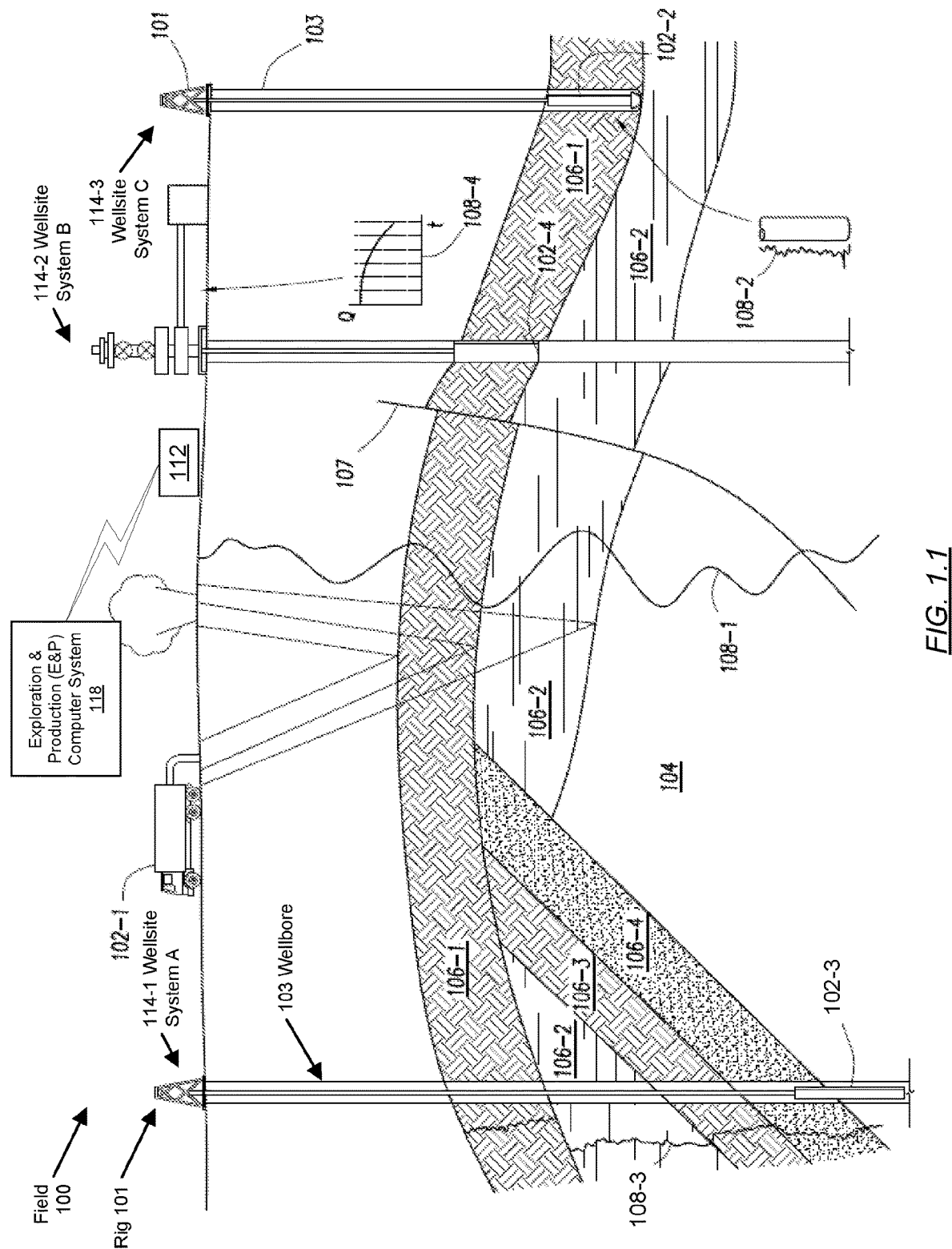
FIG. 1.1

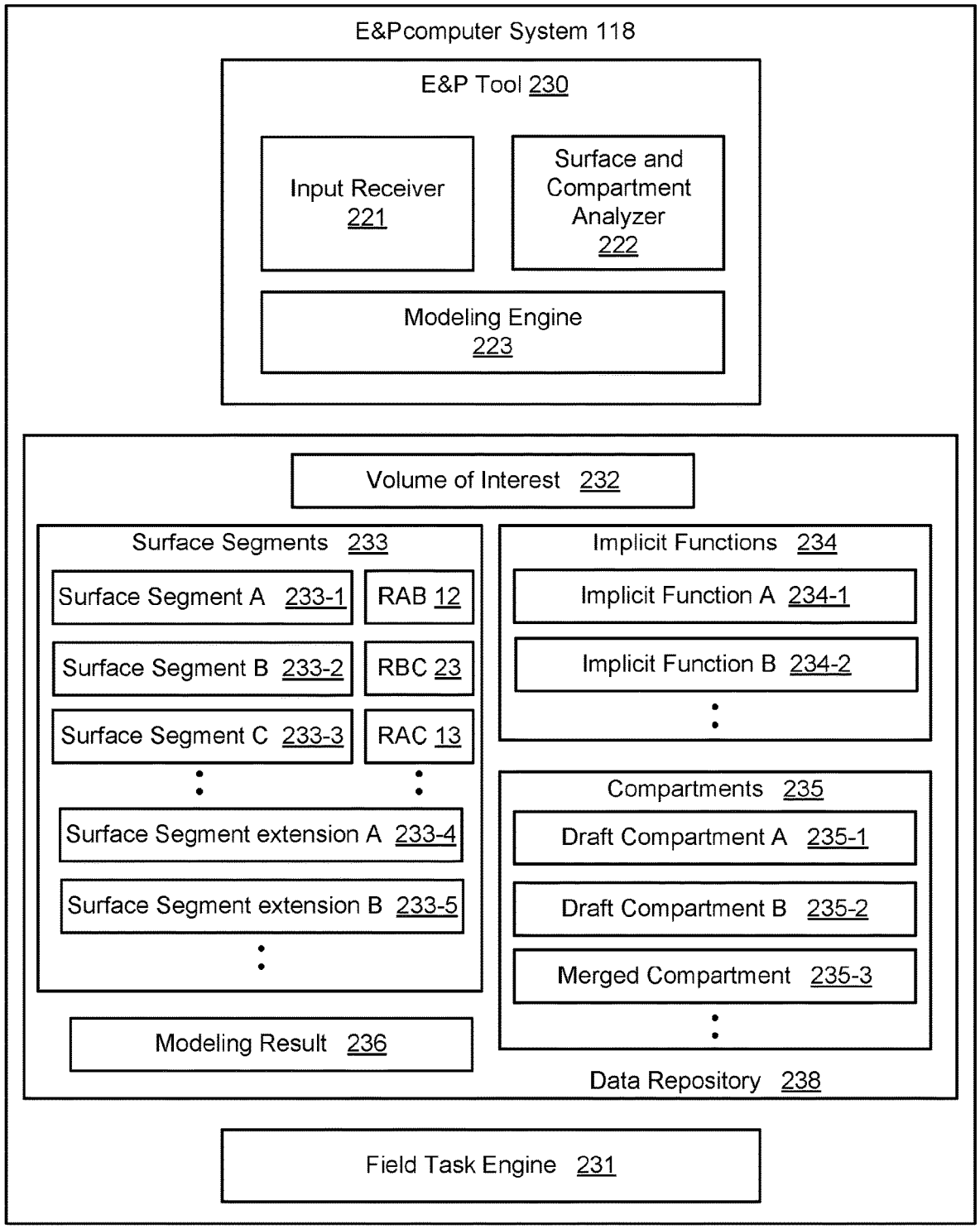
FIG. 1.2

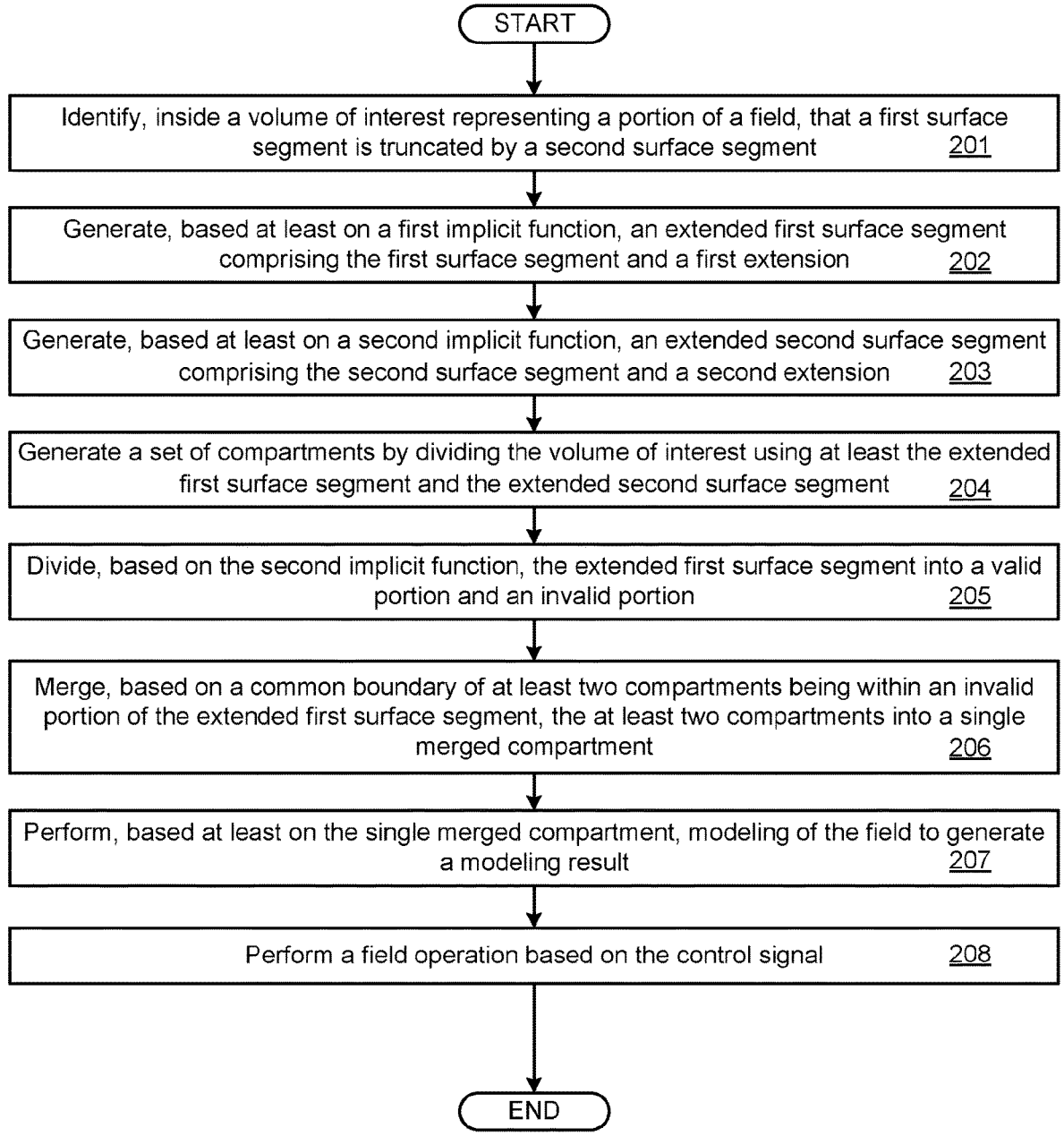
FIG. 2.1

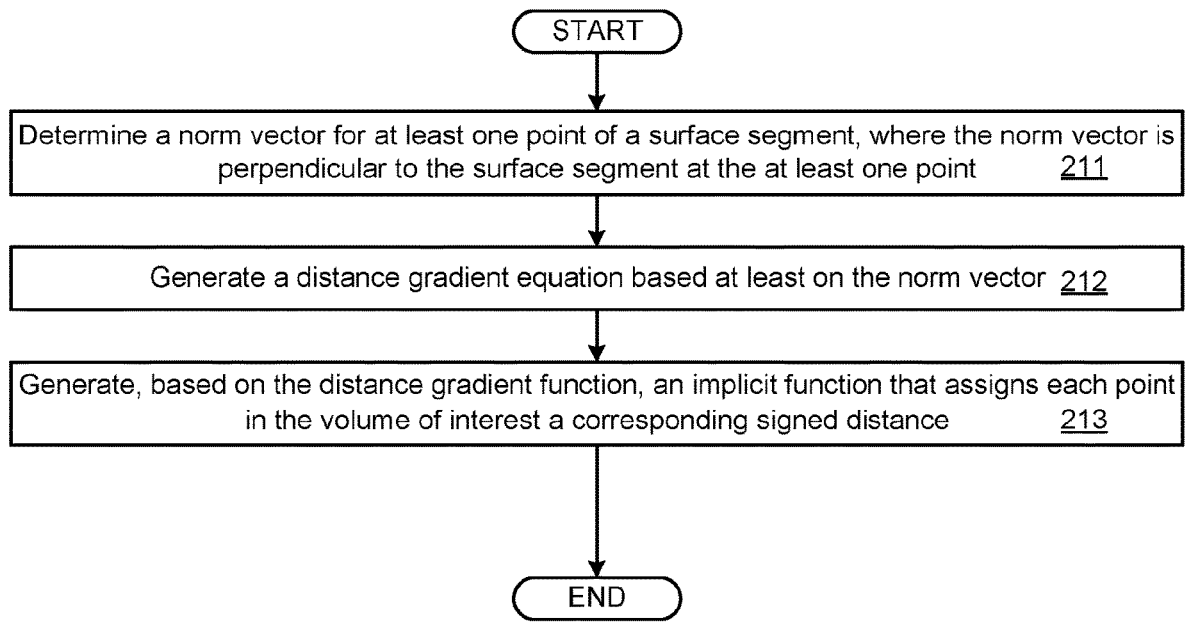
FIG. 2.2

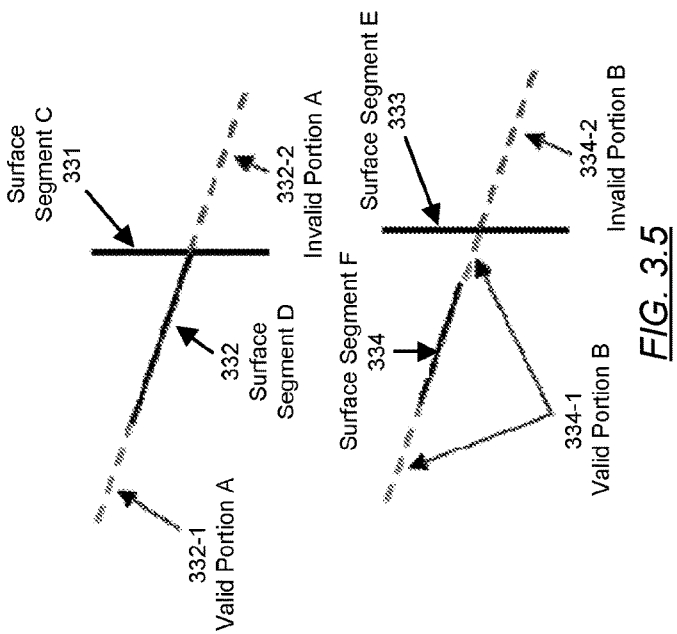
FIG. 3.1
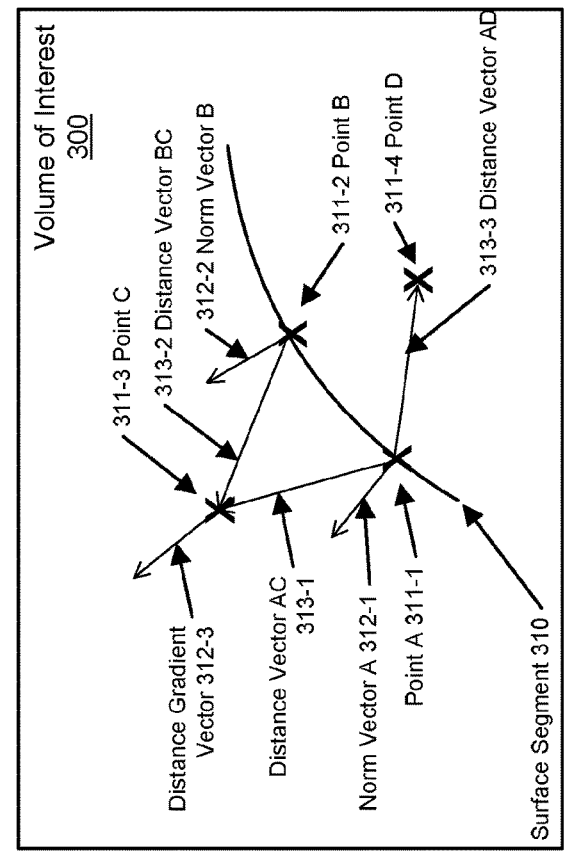
FIG. 3.5
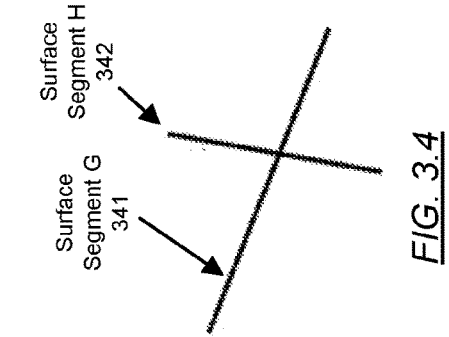
FIG. 3.4
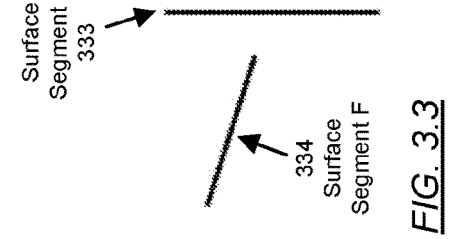
FIG. 3.3
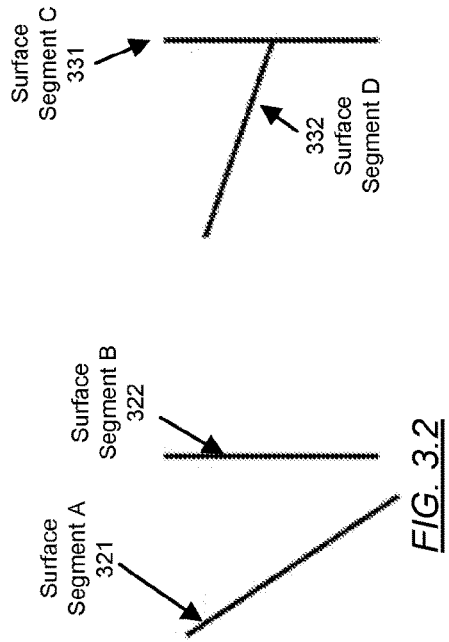
FIG. 3.2

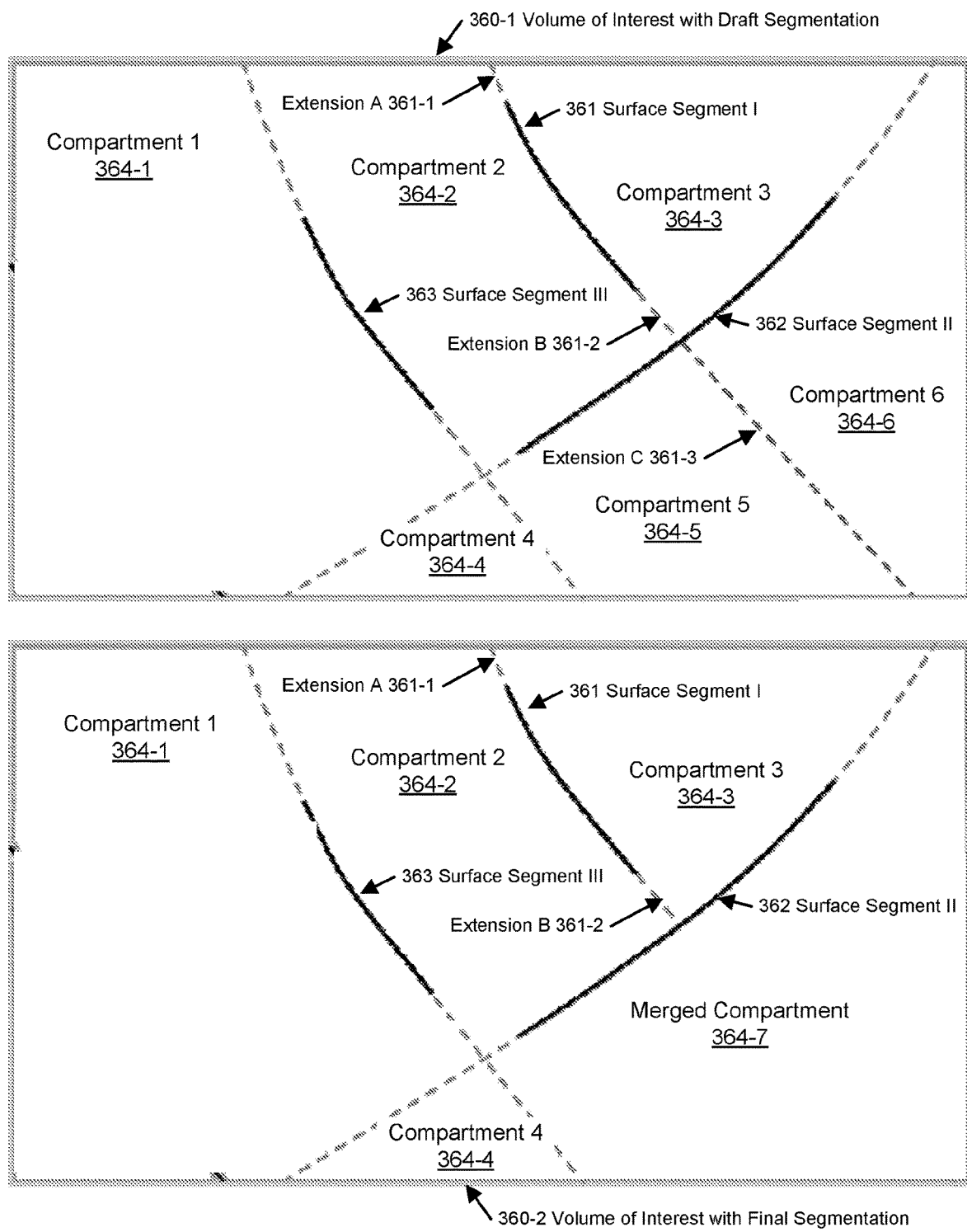
FIG. 3.6

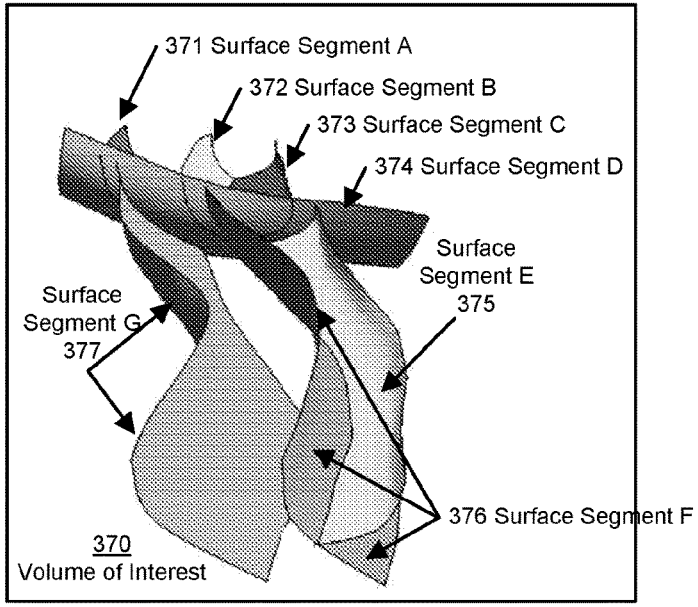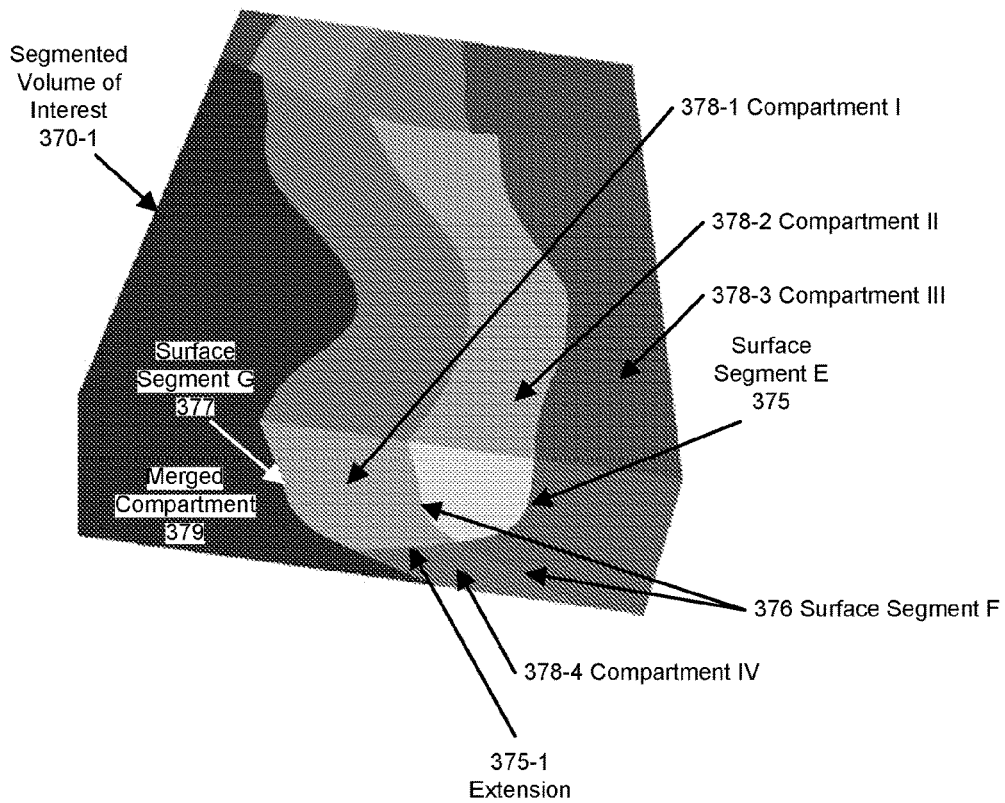
FIG. 3.7

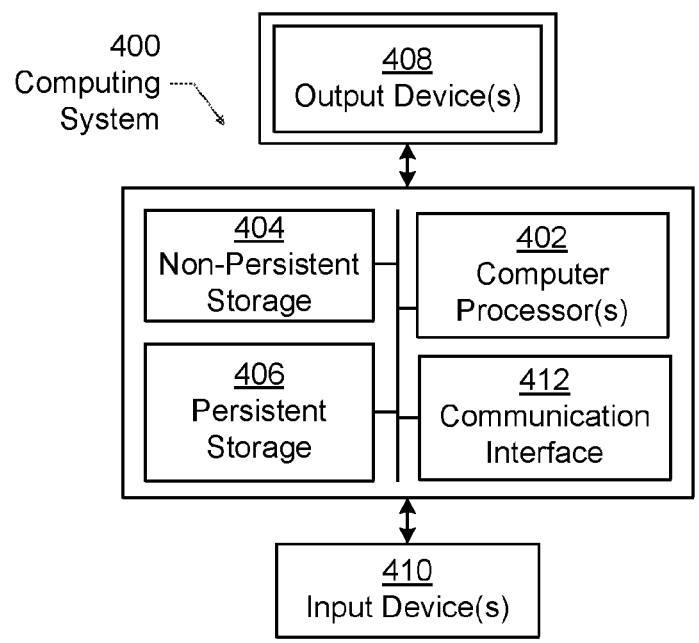
*FIG. 4.1*
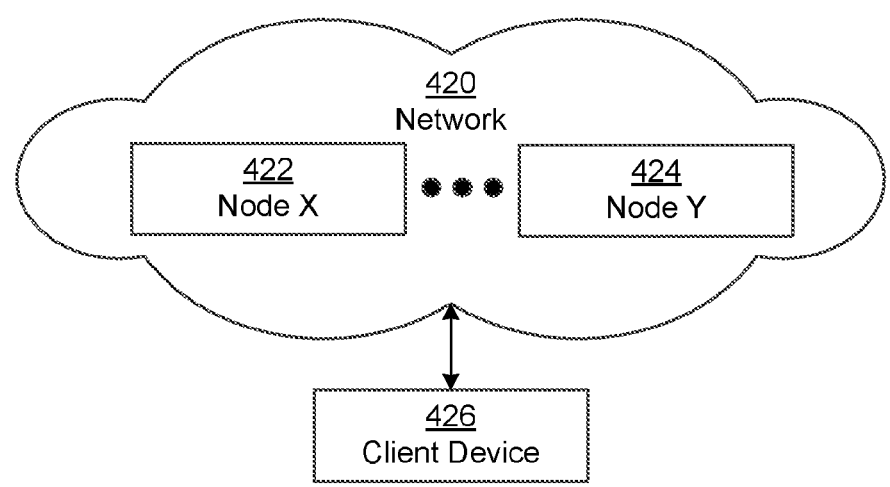
*FIG. 4.2*

STRUCTURAL VOLUME SEGMENTATION

BACKGROUND

A subterranean formation may be represented as a three-dimensional (3D) volume during modeling and simulation. The 3D volume may be divided into separate connected components based on physical and structural properties. The division may be linked to geological structures, such as faults or other geological unconformities. For example, the 3D volume may be divided into fault blocks based on the faults in the subterranean formation.

SUMMARY

In general, in one aspect, an embodiment of structural volume segmentation includes a method for performing a field operation of a field. The method includes identifying, inside a volume of interest representing a portion of the field, that a first surface segment is truncated by a second surface segment, where each of the first surface segment and the second surface segment corresponds to a geological feature in the field, generating, based at least on a first implicit function, an extended first surface segment that includes the first surface segment and a first extension of the first surface segment, generating a number of compartments by dividing the volume of interest using at least the extended first surface segment and the second surface segment, merging, based on a common boundary of at least two of the compartments being within an invalid portion of the extended first surface segment, the at least two compartments into a single merged compartment, and performing, based at least on the single merged compartment, modeling of the field to generate a modeling result.

Other aspects will be apparent from the following description and the appended claims.

BRIEF DESCRIPTION OF DRAWINGS

The appended drawings illustrate several embodiments of structural volume segmentation and are not to be considered limiting of its scope, for structural volume segmentation may admit to other equally effective embodiments.

FIG. 1.1 is a schematic view, partially in cross-section, of a field in which one or more embodiments of structural volume segmentation may be implemented.

FIG. 1.2 shows a schematic diagram of a system in accordance with one or more embodiments.

FIGS. 2.1 and 2.2 show a flowchart in accordance with one or more embodiments.

FIGS. 3.1, 3.2, 3.3, 3.4, 3.5, 3.6, and 3.7 show an example in accordance with one or more embodiments.

FIGS. 4.1 and 4.2 show systems in accordance with one or more embodiments.

DETAILED DESCRIPTION

Specific embodiments will now be described in detail with reference to the accompanying figures. Like elements in the various figures are denoted by like reference numerals for consistency.

In the following detailed description of embodiments, numerous specific details are set forth in order to provide a more thorough understanding. However, it will be apparent to one of ordinary skill in the art that one or more embodiments may be practiced without these specific details. In other instances, well-known features have not been described in detail to avoid unnecessarily complicating the description.

In general, embodiments provide a method and system for performing a field operation by at least generating a modeling result. In particular, one or more embodiments is directed to improving an accuracy of a model of a subterranean formation, and performing a field operation based on the model. In one or more embodiments, the modeling result is generated based at least on a single merged compartment inside a volume of interest that represents a portion of the field. In particular, the single merged compartment is merged from a first surface segment and a second surface segment that correspond to geological features in the field. Initially, the first surface segment is identified as being truncated by the second surface segment. An extended first surface segment is then generated based on an implicit function to include the first surface segment and an extension of the first surface segment. Accordingly, multiple compartments are generated by dividing the volume of interest using at least the extended first surface segment and the second surface segment. Based on a common boundary of at least two of these compartments being within an invalid portion of the extended first surface segment, the at least two compartments are merged into the single merged compartment.

FIG. 1.1 depicts a schematic view, partially in cross section, of a field (100) in which one or more embodiments of structural volume segmentation may be implemented. In one or more embodiments, one or more of the modules and elements shown in FIG. 1.1 may be omitted, repeated, and/or substituted. Accordingly, embodiments of structural volume segmentation should not be considered limited to the specific arrangements of modules shown in FIG. 1.1.

As shown in FIG. 1.1, the field (100) includes the subterranean formation (104), data acquisition tools (102-1), (102-2), (102-3), and (102-4), wellsite system A (114-1), wellsite system B (114-2), wellsite system C (114-3), a surface unit (112), and an exploration and production (E&P) computer system (118). The subterranean formation (104) includes several geological structures, such as a sandstone layer (106-1), a limestone layer (106-2), a shale layer (106-3), a sand layer (106-4), and a fault line (107). In particular, these geological structures form at least one reservoir containing fluids, such as hydrocarbon.

In one or more embodiments, data acquisition tools (102-1), (102-2), (102-3), and (102-4) are positioned at various locations along the field (100) for collecting data of the subterranean formation (104), referred to as survey operations. In particular, the data acquisition tools are adapted to measure the subterranean formation (104) and detect the characteristics of the geological structures of the subterranean formation (104). For example, data plots (108-1), (108-2), (108-3), and (108-4) are depicted along the field (100) to demonstrate the data generated by the data acquisition tools. Specifically, the static data plot (108-1) is a seismic two-way response time. Static data plot (108-2) is core sample data measured from a core sample of the subterranean formation (104). Static data plot (108-3) is a logging trace, referred to as a well log. Production decline curve or graph (108-4) is a dynamic data plot of the fluid flow rate over time. Other data may also be collected, such as historical data, analyst user inputs, economic information, and/or other measurement data and other parameters of interest.

Further as shown in FIG. 1.1, each of the wellsite system A (114-1), wellsite system B (114-2), and wellsite system C (114-3) is associated with a rig, a wellbore, and other wellsite equipment configured to perform wellbore operations, such as logging, drilling, fracturing, production, or other applicable operations. For example, the wellsite system A (114-1) is associated with a rig (101), a wellbore (103), and drilling equipment to perform drilling operation. Similarly, the wellsite system B (114-2) and wellsite system C (114-3) are associated with respective rigs, wellbores, other wellsite equipments, such as production equipment and logging equipment to perform production operations and logging operations, respectively. Generally, survey operations and wellbore operations are referred to as field operations of the field (100). In addition, data acquisition tools and wellsite equipments are referred to as field operation equipments. The field operations are performed as directed by a surface unit (112). For example, the field operation equipment may be controlled by a field operation control signal that is sent from the surface unit (112).

In one or more embodiments, the surface unit (112) is operatively coupled to the data acquisition tools (102-1), (102-2), (102-3), (102-4), and/or the wellsite systems. In particular, the surface unit (112) is configured to send commands to the data acquisition tools (102-1), (102-2), (102-3), (102-4), and/or the wellsite systems and to receive data therefrom. In one or more embodiments, the surface unit (112) may be located at the wellsite system A (114-1), wellsite system B (114-2), wellsite system C (114-3), and/or remote locations. The surface unit (112) may be provided with computer facilities (e.g., an E&P computer system (118)) for receiving, storing, processing, and/or analyzing data from the data acquisition tools (102-1), (102-2), (102-3), (102-4), the wellsite system A (114-1), wellsite system B (114-2), wellsite system C (114-3), and/or other parts of the field (100). The surface unit (112) may also be provided with or have functionally for actuating mechanisms at the field (100). The surface unit (112) may then send command signals to the field (100) in response to data received, stored, processed, and/or analyzed, for example to control and/or optimize various field operations described above.

In one or more embodiments, the surface unit (112) is communicatively coupled to the E&P computer system (118). In one or more embodiments, the data received by the surface unit (112) may be sent to the E&P computer system (118) for further analysis. Generally, the E&P computer system (118) is configured to analyze, model, control, optimize, or perform management tasks of the aforementioned field operations based on the data provided from the surface unit (112). In one or more embodiments, the E&P computer system (118) is provided with functionality for manipulating and analyzing the data, such as performing simulation, planning, and optimization of production operations of the wellsite system A (114-1), wellsite system B (114-2), and/or wellsite system C (114-3). In one or more embodiments, the result generated by the E&P computer system (118) may be displayed for an analyst user to view the result in a two dimensional (2D) display, three dimensional (3D) display, or other suitable displays. Although the surface unit (112) is shown as separate from the E&P computer system (118) in FIG. 1.1, in other examples, the surface unit (112) and the E&P computer system (118) may also be combined.

Although FIG. 1.1 shows a field (100) on the land, the field (100) may be an offshore field. In such a scenario, the subterranean formation may be in the sea floor. Further, field data may be gathered from the field (100) that is an offshore field using a variety of offshore techniques for gathering field data.

FIG. 1.2 shows more details of the E&P computer system (118) in which one or more embodiments of structural volume segmentation may be implemented. In one or more embodiments, one or more of the modules and elements shown in FIG. 1.2 may be omitted, repeated, and/or substituted. Accordingly, embodiments of structural volume segmentation should not be considered limited to the specific arrangements of modules shown in FIG. 1.2.

As shown in FIG. 1.2, the E&P computer system (118) includes an E&P tool (230), a data repository (238) for storing input data, intermediate data, and resultant outputs of the E&P tool (230), and a field task engine (231) for performing various tasks of the field operation. In one or more embodiments, the data repository (238) may include one or more disk drive storage devices, one or more semiconductor storage devices, other suitable computer data storage devices, or combinations thereof. In one or more embodiments, content stored in the data repository (238) may be stored as a data file, a linked list, a data sequence, a database, a graphical representation, any other suitable data structure, or combinations thereof.

In one or more embodiments, the content stored in the data repository (238) includes the volume of interest (232), surface segments (233), implicit functions (234), compartments (235), and modeling result (236). In one or more embodiments, the volume of interest (232) includes a three-dimensional (3D) volume that represents a portion of a field. For example, the 3D volume may represent a portion of the subterranean formation (104) depicted in FIG. 1.1 above. For example, the topology of the portion of the subterranean formation (104) may be represented by geometrical parameters (e.g., dimensions and shapes) of the volume of interest (232). In one or more embodiments, the volume of interest (232) is associated with a grid having a large number (e.g., thousands, hundreds of thousand, millions, etc.) of grid cells, each grid cell corresponding to a location in the portion of the subterranean formation. In the volume of interest (232), each grid cell may have one or more attribute values that define the attributes (e.g., rock properties, etc.) of the subterranean formation at the corresponding location.

In one or more embodiments, the volume of interest (232) defines a bounding box of a structural model (not shown) for modeling structural characteristics of the subterranean formation (104) depicted in FIG. 1.1 above. In other words, the structural model represents the geometry of the subterranean formation. The geometry of the subterranean formation may be the geological features (e.g., rock boundaries that separate different types of rocks) as defined by horizons, unconformities, intrusions, faults, and other such boundaries. For example, the structural model (not shown) may include information that describes geological features (e.g., faults, erosion surfaces, geological layers, etc.) as surface segments (233) inside the volume of interest (232). In other words, the surface segments (233) may be part of a larger dataset, such as the structural model (not shown). For example, the surface segments (233) may include a surface segment A (233-1), surface segment B (233-2), surface segment C (233-3), etc. representing corresponding geological features in the structural model (not shown). In one or more embodiments, a surface segment is defined by a set of points representing positions in a corresponding geological feature. In one or more embodiments, the volume of interest (232) is divided by the surface segments (233) into compartments (235). In particular, a compartment is a connected portion of the volume of interest (232) that is bounded by one or more surface segments. In one or more embodiments, the volume of interest (232), the surface segments (233), and the compartments (235) are included in the structural model (not shown).

Structural modeling is a technique to construct the structural model (not shown) by transforming seismic and wells data into an initial portion of the surface segments (233) that represent the faults or other geological features. Because of the inability and/or infeasibility of sensors to gather data from each location of the subterranean formation, full knowledge of the subterranean formation is generally not available. Accordingly, the structural model is an approximation of the subterranean formation based at least in part on sensor data that is acquired. The greater the accuracy of the structural model, the more efficient and productive are field operations to gather hydrocarbons and other valuable assets from the subterranean formation. One or more embodiments improve the accuracy of the structural model, and thereby improve the field operations performed.

Fault modeling is a step of constructing the structural model. In particular, the fault modeling aims to model the faults as well as the fault networks (i.e. how the modeled faults interact with each other). From time to time, the fault modeling may generate an incomplete representation of a fault feature. For example, a generated surface segment in the initial portion of the surface segments (233) may represent an incomplete portion of the fault and is referred to as an incomplete surface segment. For example, one or more of the surface segment A (233-1), surface segment B (233-2) and surface segment C (233-3) may be an incomplete surface segment representing an incomplete portion of a corresponding fault. As a result, certain portion of the volume of interest (232) may be partially divided by an incomplete surface segment. In other words, certain compartments may be partially separated from an adjoining compartment along the incomplete surface segment.

As used herein, the signed distance is a distance measure that has the same sign for points in the volume of interest (232) relative to one side of a surface segment and has the opposite sign for points in the volume of interest (232) relative to the opposite side of the surface segment. In other words, a side relative to the surface segment includes points in the volume of interest (232) that have the same sign of the signed distance to the surface segment. In particular, the side associated with the positive signed distance is referred to as the positive side of the surface segment. The opposite side associated with the negative signed distance is referred to as the negative side of the surface segment.

In one or more embodiments, the surface segments (233) are associated with the implicit functions (234) that define a signed distance of each point in the volume of interest (232) relative to each surface segment. An implicit function is a mathematical function that is defined implicitly as a first variable in an equation, such as a distance gradient equation described below. Specifically, the first variable corresponds to the output of the mathematical function where a second variable in the equation corresponds to an input (i.e., argument) of the mathematical function. In other words, the implicit function maps a value of the second variable to a corresponding value of the first variable according to the equation. For example, the implicit function A (234-1) is associated with the surface segment A (233-1) and maps each point in the volume of interest (232) to a signed distance to the surface segment A (233-1). Similarly, the implicit function B (234-2) is associated with the surface segment B (233-2) and maps each point in the volume of interest (232) to a signed distance to the surface segment B (233-2). In one or more embodiments, the implicit function A (234-1) is defined by a distance gradient equation specifying that, for each point of the surface segment A (233-1), (a) the spatial gradient of the signed distance to the surface segment A (233-1) equals a normal vector of the surface segment A (233-1) and (b) the signed distance from any point of the surface segment A (233-1) to the surface segment A (233-1) itself is zero. Similarly, the implicit function B (234-2) is defined by another distance gradient equation specifying that, for each point of the surface segment B (233-2), (c) the spatial gradient of the signed distance to the surface segment B (233-2) equals a normal vector of the surface segment (233-2) and (d) the signed distance from any point of the surface segment B (233-2) to the surface segment B (233-2) itself is zero. An example of the surface segment, normal vector, and implicit function is described in reference to FIG. 3.1 below.

In one or more embodiments, surface segment extensions are generated as an additional portion of the surface segments (233). In one or more embodiments, a surface segment extension is an addition to the incomplete surface segment and is generated based on the signed distance according to the associated implicit function. In one or more embodiments, the surface segment extension extends along the same path (e.g., direction) as the incomplete surface segment and is connected to the incomplete surface segment. Thus, the surface segment extension may represent a same fault as the incomplete surface segment. The surface segment extension and the incomplete surface segment are collectively referred to as the extended surface segment. For example, the surface segment extension A (233-4) may be an extension of the surface segment A (233-1) that is generated based on the signed distance according to the implicit function A (234-1). An extended surface segment is formed as a combination of the surface segment A (233-1) and the surface segment extension A (233-4). In another example, the surface segment extension B (233-5) may be an extension of the surface segment B (233-2) that is generated based on the signed distance according to the implicit function B (234-2). An extended surface segment is formed as a combination of the surface segment B (233-2) and the surface segment extension B (233-5). In one or more embodiments, the surface segment extension A (233-4) and the surface segment extension B (233-5) improve the representation of the corresponding geological features in the structural model (not shown) and improve the incomplete division of certain portions of the volume of interest (232). The incomplete surface segments, surface segment extension, and extended surface segment are types of surface segments in accordance with one or more embodiments. Examples of surface segment extensions are described in reference to FIG. 3.5 below.

In one or more embodiments, a pair of surface segments in the surface segments (233) is associated with a relation. For example, the relation between the surface segment A (233-1) and surface segment B (233-2) is stored in the repository (238) as RAB (12). The relation between the surface segment B (233-2) and surface segment C (233-3) is stored in the repository (238) as RBC (23). The relation between the surface segment A (233-1) and surface segment C (233-3) is stored in the repository (238) as RAC (13). In one or more embodiments, the relation between two surface segments (denoted as S1 and S2) is one of (i) no relation, (ii) truncating relation, i.e., S1 is truncated by S2 or S2 is truncated by S1, and (iii) intersecting relation. In other words, each of the RAB (12), RBC (23), and RAC (13) may be one of no relation, truncating relation, and intersecting relation.

In one or more embodiments, in the no relation scenario, S1 and S2 are said to have no relation if and only if (a) points of S1 are in one side relative to S2 and (b) points of S2 are in one side relative to S1. In other words, S1 and S2 are said to have no relation if and only if (a) the signed distances of points of S1 to S2 have the same sign and (b) the signed distances of points of S2 to S1 have the same sign. An example of two surface segments having no relation is described in reference to FIG. 3.2 below.

In one or more embodiments, in the truncating relation scenario, S1 is said to be truncated by S2 if and only if (c) points of S1 are in one side (referred to as the valid side) relative to S2 and (d) some points of S2 are in two opposite sides relative to S1. In other words, S1 is said to be truncated by S2 if and only if (c) the signed distances of points of S1 to S2 have the same sign and (d) the signed distances of some points of S2 to S1 have opposite signs. In this scenario, the extended surface segments of S1 and S2 intersect each other. The portion of the surface segment extension of S1 in the valid side relative to S2 is referred to as the valid portion of the surface extension. The portion of the surface segment extension of S1 opposite to the valid side relative to S2 is referred to as the invalid portion of the surface extension. In one or more embodiments, the truncating relation is specified (e.g., by a user) prior to generating the surface segment extensions. Accordingly, the invalid portion of the surface extension is removed to preserve or otherwise maintain the truncating relation. For example, during the fault modeling, a fault surface is not expected to cross a pre-existing geological feature (e.g., an erosion surface) that has previously been set as truncating the fault surface. An example of two surface segments having truncating relation is described in reference to FIG. 3.3 below. An example of valid and invalid portions of a surface segment extension is described in reference to FIG. 3.5 below.

In the intersecting relation scenario, S1 and S2 are said to intersect each other if and only if (e) the points of S1 are in two sides of S2 and (f) the points of S2 are in two sides of S1. An example to two surface segments having intersecting relation is described in reference to FIG. 3.4 below.

In one or more embodiments, each point in the volume of interest (232) is assigned a position array (not shown). The position array (not shown) includes one entry for each surface segment in the volume of interest (232). In other words, the size of the position array (not shown) is the number of surface segments in the volume of interest (232). In one or more embodiments, each entry in the position array (not shown) is assigned a value based on the position of the point relative to an extended surface segment in the surface segments (233). For example, the value may be one of the three following values:

0: if the point is on the positive side of the extended surface segment,

1: if the point is on the negative side of the extended surface segment,

2: if the point is not visible from the extended surface segment.

In one or more embodiments, a draft compartment (e.g., draft compartment A (235-1), draft compartment B (235-2)) of the compartments (235) is defined as the set of connected points having the same position array (not shown). In other words, points in one draft compartment (e.g., draft compartment A (235-1) or draft compartment B (235-2)) are in the same side relative to each extended surface segment in the surface segments (233). In one or more embodiments, each draft compartment (e.g., draft compartment A (235-1), draft compartment B (235-2)) turns into a final compartment (not shown) if the draft compartment is not bounded by an invalid portion of any surface segment extension. In contrast, multiple draft compartments bounded by an invalid portion of any surface segment extension are merged into a merged compartment (e.g., merged compartment (235-3)) after removing the invalid portion. An example of the compartments (235) is described in reference to FIGS. 3.6 and 3.7 below.

In one or more embodiments, the E&P tool (230) includes the input receiver (221), the surface and compartment analyzer (222), and the modeling engine (223). Each of these components of the E&P tool (230) is described below.

In one or more embodiments, the input receiver (221) is configured to obtain the volume of interest (232) and seismic and wells data for analysis by the surface and compartment analyzer (222) and the modeling engine (223). The wells data may include a gamma ray log, a sonic log, a bulk density log, and/or other types of logging results generated by a data acquisition tool, such as the data acquisition tool (102-3) depicted in FIG. 1.1 above. In one or more embodiments, the input receiver (221) obtains the volume of interest (232) from a user. In other words, the volume of interest (232) is specified by user. In one or more embodiments, the input receiver (221) obtains the seismic and wells data, at least in part, from the surface unit (112) depicted in FIG. 1.1 above. For example, the input receiver (221) may obtain one or more portions of the seismic and wells data from the surface unit (112) intermittently, periodically, in response to a user activation, or as triggered by an event. Accordingly, the intermediate and final results of the surface and compartment analyzer (222) and the modeling engine (223) may be generated intermittently, periodically, in response to a user activation, or as triggered by an event.

In one or more embodiments, the surface and compartment analyzer (222) is configured to generate the implicit functions (234) based on the initial portion of the surface segments (233), Further, the surface and compartment analyzer (222) uses the implicit functions (234) to generate the surface segment extensions in the additional portion of the surface segments (233). Based on the resultant extended surface segments, the surface and compartment analyzer (222) further generates a valid compartmentalization of the volume of interest (232). In one or more embodiments, the surface and compartment analyzer (222) generates the implicit functions (234) and the compartments (235) using the method described in reference to FIGS. 2.1 and 2.2 below.

In one or more embodiments, the modeling engine (223) is configured to perform modeling of a field. In one or more embodiments, the modeling includes structural modeling, such as the fault modeling that generates an initial portion of the surface segments (233) based on the seismic and wells data obtained by the input receiver (221). Based on the compartments (235) generated by the surface and compartment analyzer (222), the modeling engine (223) further generates additional structural description of the field to complete a structural model of the field. For example, the modeling result (236) may include the structural model that is decomposed or otherwise organized based on the compartments (235).

In one or more embodiments, the modeling further includes reservoir modeling and/or basin modeling, such as performing simulation, planning, and optimization of exploratory and/or production operations of the wellsite system A (114-1), wellsite system B (114-2), and/or wellsite system C (114-3) depicted in FIG. 1.1 above. For example, the modeling result (236) may further include geostatistics that are used to predict hydrocarbon content throughout portions of the field and to facilitate drilling, fracturing, or other exploratory and/or production operations of the field.

In one or more embodiments, the result generated by the E&P computer system (118) may be displayed to a user using a two dimensional (2D) display, three dimensional (3D) display, or other suitable displays. In one or more embodiments, the analysis or display rendering of intermediate or final results of the E&P computer system (118) may be performed separately (e.g., by separate computing nodes) for each compartment of the compartments (235) based on computing efficiency considerations. This computing task decomposition may be beneficial in many applications. An example is volume quantification when volumes in individual parts/regions of the structural model are assessed based on the compartments (235). Another application example relates to visualization performance for a large grid where display rendering speed is improved by a decomposition into multiple portions of the large grid based on the compartments (235).

In one or more embodiments, the E&P computer system (118) includes the field task engine (231) that is configured to generate a field operation control signal based at least on a result generated by the E&P tool (230), such as based on the compartments (235) and the modeling result (236). As noted above, the field operation equipment depicted in FIG. 1.1 above may be controlled by the field operation control signal. For example, the field operation control signal may be used to control drilling equipment, an actuator, a fluid valve, or other electrical and/or mechanical devices disposed about the field (100) depicted in FIG. 1.1 above.

The E&P computer system (118) may include one or more system computers, such as shown in FIGS. 4.1 and 4.2 below, which may be implemented as a server or any conventional computing system. However, those skilled in the art, having benefit of this disclosure, will appreciate that implementations of various technologies described herein may be practiced in other computer system configurations, including hypertext transfer protocol (HTTP) servers, handheld devices, multiprocessor systems, microprocessor-based or programmable consumer electronics, network personal computers, minicomputers, mainframe computers, and the like.

While specific components are depicted and/or described for use in the units and/or modules of the E&P computer system (118) and the E&P tool (230), a variety of components with various functions may be used to provide the formatting, processing, utility and coordination functions for the E&P computer system (118) and the E&P tool (230). The components may have combined functionalities and may be implemented as software, hardware, firmware, or combinations thereof.

FIGS. 2.1 and 2.2 depict an example method in accordance with one or more embodiments. For example, the method depicted in FIGS. 2.1 and 2.2 may be practiced using the E&P computer system (118) described in reference to FIGS. 1.1 and 1.2 above. In one or more embodiments, one or more of the elements shown in FIGS. 2.1 and 2.2 may be omitted, repeated, and/or performed in a different order. Accordingly, embodiments of structural volume segmentation should not be considered limited to the specific arrangements of elements shown in FIGS. 2.1 and 2.2.

In particular, FIG. 2.1 shows an example flow chart to generate a set of compartments based on an initial set of surface segments within a volume of interest. Initially in Block 201, the initial set of surface segments is obtained. In one or more embodiments, the initial set of surface segments is generated by performing fault modeling based on measurements of the field. In addition, an indication is received that, within the initial set of surface segments, a first surface segment is truncated by a second surface segment.

In Block 202, an extended first surface segment is generated that includes the first surface segment and a first extension of the first surface segment. In one or more embodiments, the first extension includes points in the volume of interest but not in the first surface segment where each signed distance of the points to the first surface segment equals zero. In one or more embodiments, the signed distance to the first surface segment is determined based on a first implicit function associated with the first surface segment. For example, the first implicit function may map each point to a corresponding signed distance based on a distance gradient equation associated with the first surface segment. In one or more embodiments, the first implicit function is generated using the method described in reference to FIG. 2.2 below.

In Block 203, an extended second surface segment is generated that includes the second surface segment and a second extension of the second surface segment. In one or more embodiments, the second extension includes points in the volume of interest but not in the second surface segment where each signed distance of the points to the second surface segment equals zero. In one or more embodiments, the signed distance to the second surface segment is determined based on a second implicit function associated with the second surface segment. For example, the second implicit function may map each point to a corresponding signed distance based on a distance gradient equation associated with the second surface segment. In one or more embodiments, the second implicit function is generated using the method described in reference to FIG. 2.2 below.

In Block 204, a set of draft compartments is generated by dividing the volume of interest using at least the extended first surface segment and the second surface segment. In one or more embodiments, one of the positive side or the negative side is selected for each point in the volume of interest relative to each extended surface segment, such as the extended first surface segment, extended second surface segment, etc. Accordingly, a position array is assigned to each point in the volume of interest to indicate which side the point belongs relative to each of the surface segments. The volume of interest is then divided into a draft segmentation by at least grouping points having the same position array into a draft compartment.

In Block 205, using the second implicit function, a second signed distance to the second surface segment is determined for each point of the extended first surface segment. Accordingly, the extended first surface segment is divided into a valid portion and an invalid portion based on the second signed distance. In particular, the valid portion of the extended first surface segment includes the first surface segment and a valid portion of the first extension both having the same sign in the signed distances to the second surface segment. In contrast, the invalid portion of the extended first surface segment includes any point in the first extension having the opposite sign in the signed distances to the second surface segment. In other words, the valid portion and the invalid portion are associated with opposite signs of the signed distance to the second surface segment.

In Block 206, based on a common boundary of at least two draft compartments being within an invalid portion of the extended first surface segment, the at least two draft compartments are merged into a single merged compartment. In one or more embodiments, the invalid portion of the extended first surface segment is removed to form the single merged compartment. After invalid portions of extended surface segments are removed from the volume of interest, remaining draft compartments that are not merged turn into the final compartments. Accordingly, merged compartments and other final compartments collectively form the final segmentation of the volume of interest.

In Block 207, modeling of the field is performed based at least on the single merged compartment to generate a modeling result. In one or more embodiments, the modeling is performed based on the final segmentation of the volume of interest.

In Block 208, a field operation is performed based on the modeling result. In one or more embodiments, a control signal is first generated based on the modeling result. Accordingly, the field operation is then performed based on the control signal.

FIG. 2.2 shows an example flow chart to generate an implicit function of a surface segment. Initially in Block 211, a norm vector is determined for a point of the surface segment. In particular, the norm vector is perpendicular to the surface segment at the point.

In Block 212, a distance gradient equation is generated based at least on the norm vector. In one or more embodiments, the distance gradient equation includes a variable (referred to as the signed distance variable) representing the signed distance from each point in the volume of interest to the surface segment. In particular, the distance gradient equation specifies that, for each point of the surface segment, (a) the spatial gradient of the signed distance to the surface segment equals the normal vector of the surface segment and (b) the signed distance from any point of the surface segment to the surface segment itself is zero.

In Block 213, the implicit function is generated based on the distance gradient equation. Specifically, the implicit function maps each point in the volume of interest to a corresponding value of the signed distance variable according to the distance gradient equation. In other words, the implicit function implicitly assigns a corresponding signed distance to each point in the volume of interest.

As an example, a workflow based on the flow charts described above may include the following. After initialization of the system, an implicit function is computed for each surface segment. A Cartesian regular grid is then constructed from the bounding box of the volume of interest and used as a support for these computed implicit functions. The surface of each surface segment (containing the initial surface and associated extensions) is extracted from the Cartesian grid using a corresponding implicit function. A draft segmentation of the volume of interest is performed based on each extracted surface segment in the Cartesian regular grid. The draft segmentation uses both the valid and invalid extensions as described above. Finally, a final segmentation of the volume of interest is computed by merging the draft segments that are separated by invalid extensions. TABLE 1 shows a list of example pseudo code to implement a workflow in accordance with one or more embodiments.

TABLE 1

1. Initialization
   for each 3D surface segment S
      for each point P compute the norm vector:
$$N_P = \frac{\sum_{i=1}^{k} A_i \times N_i}{\sum_{i=1}^{k} A_i},$$

where i is a triangulated 2D element of S adjacent to P, $A_i$ and $N_i$ are the area and the unit norm vector, respectively, of the triangulated 2D element i, normalize this norm vector: $N_P = \frac{N_P}{\|N_P\|},$ end for
   end for
End initialization
2. First signed distance Function Computing
   for each surface segment S
      select $m_s$ points on S using a clustering method, e.g., Lloyd algorithm (this is optional)
      use the Hermite-RBF interpolation method HRBF (or other interpolation method) on the selected $m_s$ points
      for each point P of $m_s$
         value of distance function: $dist_s(P) = 0$
         gradient of the distance function: $\nabla dist_s(P) = N_P$
      end for
   end for
End distance computing
3. Evaluation of the first implicit functions in a regular grid
   construct a regular grid G on the bounding box of the volume of interest (with a given resolution)
   for each point M of G
      evaluate the first implicit function of each surface segment on M (i.e., compute the value of the first signed distance of M relative to each surface segment)
   end for
End evaluation
4. Surface extraction/interpolation
   extract the surface of each surface segment (by the marching cubes method)
   for each extracted surface TABLE 1-continued

```
         interpolate all other first implicit functions on its points (by a tri-linear interpolation from
            G)
      end for
   End surface extraction/interpolation
   5. Draft Segmentation
      define a first segment C_0 made of the external facets of the grid G (the facets of the
         bounding box of the volume of interest). Note that a segment is defined by a closed
         surface (set of facets).
      create an empty queue FIFO
      for each surface segment S
         for each segment C_i
            if S splits C_i (i.e., the facets of C_i are in both sides of S)
               cut all the facets of C_i that are crossed by the first implicit function of S (using an
               iso-line extraction/insertion algorithm, such as the marching triangles method for the
               extraction and triangle clipping algorithm for the insertion)
               split the result facets of C_i into two groups
                  group-: all the result facets that are in the negative side of S
                  group+: all the result facets that are in the positive side of S
               end split
               detect all the facets groupS of S that are inside C_i (groupS is a subset of S)
               set: C_i =groupS + group- and C_{i+1} =groupS + group+
               if the facets of groupS are invalid (see the definition above)
                  set their embedding to -1 and add them to FIFO
               end if
               store the relation of neighborhood between C_i and C_{i+1} via the facets groupS
            end if
         end for
      end for
   End Draft Segmentation
   6. Segmentation (using the facets embedding)
      do
         take the first group groupS of facets from FIFO
         get the two adjacent segments C_i and C_k to the facets of the group groupS
         create a new segment C_j = union of all the facets of C_i and C_k - facets of groupS
         update the list of segments:
            remove the segments C_i and C_k and add the new segment C_j
            update the neighborhood relationships (remove groupS from the neighborhood list
               and replace C_i and C_k by C_j in the remaining relations)
      while FIFO is not empty
   End Segmentation
```

In one or more embodiments, the items 1 to 4 in TABLE 1 may be parallelized by element (e.g., surface segment, point, etc.) which allows computing resource and time efficient compartment generation. Further, each surface segment is defined as a set of points and associated norm vectors instead of as facets of a pre-computed mesh (e.g., a tetrahedral mesh). As a result, tetrahedral mesh computation may be eliminated to improve computing time and resource allocation. Further, dependency on any underlying mesh is eliminated from the implicit functions. In contrast, other methods for implicit function computation, such as the least-square methods, are sensitive to the shape of the tetrahedral mesh elements, which compromise the smoothness of the generated implicit function.

FIGS. 3.1, 3.2, 3.3, 3.4, 3.5, 3.6, and 3.7 show an example in accordance with one or more embodiments. In one or more embodiments, the example shown in these figures may be practiced using the E&P computer system shown in FIGS. 1.1 and 1.2 and the method described in reference to FIGS. 2.1 and 2.2 above. The following example is for example purposes and not intended to limit the scope of the claims. While the example schematic diagrams shown in FIGS. 3.1, 3.2, 3.3, 3.4, 3.5, and 3.6 may represent a three-dimensional (3D) volume and 3D surface segments, the example schematic diagrams are shown in a two-dimensional (2D) format for illustration.

FIG. 3.1 shows an example schematic diagram of a volume of interest (300) having a surface segment (310) that represents a portion of a subterranean formation having a geological feature, such as a fault. The volume of interest (300) may be associated with a grid (not explicitly shown) such that various positions in the represented portion of the subterranean formation correspond to grid points of the grid, such as a point A (311-1), a point B (311-2), a point C (311-3), and a point D (311-4). Further, the surface segment (310) may be defined by a set of points (e.g., point A (311-1), point B (311-2), etc.) that correspond to positions in the represented geological feature. As noted above, the signed distance to the surface segment (310) is defined by an implicit function that specifies the signed distance as a variable in a distance gradient equation.

As shown in FIG. 3.1, the distance gradient equation includes the signed distance from any point (e.g., point A (311-1), point B (311-2), point C (311-3), point D (311-4), etc.) in the volume of interest (300) to the surface segment (310) as a variable. As noted above, the distance gradient equation specifies that the signed distance equals zero for any point of the surface segment (310), such as the point A (311-1), point B (311-2), etc. Further, the distance gradient equation specifies that the spatial gradient of the signed distance at any point of the surface segment (310) (e.g., point A (311-1), point B (311-2), etc.) equals the norm vector of the surface segment (310). For example, the spatial gradient of the signed distance at the point C (311-3) may be represented by the distance gradient vector (312-3). Specifically, each vector element of the distance gradient vector (312-3) equals the rate of change of the signed distance along a corresponding axis of the volume of interest (300). Based on the distance gradient equation, the distance gradient vector (312-3) becomes infinitesimally close to a norm vector A (312-1) as the point C (311-3) moves toward point A (311-1). Specifically, the norm vector A (312-1) is a normalized (i.e., with a length of one unit) vector that is perpendicular to the surface segment (310) at the point A (311-1). Similarly, the distance gradient vector (312-3) becomes infinitesimally close to a norm vector B (312-2) as the point C (311-3) moves toward point B (311-2).

A mathematical solution of the distance gradient equation for the signed distance may include contributions from points on the surface segment (310). For example, the contribution of the point A (311-1) to the signed distance computation may be based on the norm vector A (312-1) and a distance vector AC (313-1) from the point A (311-1) to the point C (311-3). The contribution of the point A (311-1) may be based on a projection of the distance vector AC (313-1) onto the norm vector A (312-1), e.g., computed as a scalar product (denoted as SPA) of the distance vector AC (313-1) and the norm vector A (312-1). Similarly, the contribution of the point B (311-2) to the signed distance computation may be computed as the scalar product (denoted as SPB) of the distance vector BC (313-2) and the norm vector B (312-2). The contributions of other points of the surface segment (310) to the signed distance computation may also be computed as the scalar product of respective distance vectors and norm vectors. For example, the signed distance solution of the distance gradient equation may be a harmonic mean of contributions from points of the surface segment (310). In other words, the signed distance of the point C (311-3) may equal N/(1/SPA+1/SCB+ . . . ) where N is the number of points contributing to the signed distance solution. Because the projections of the distance vectors (e.g., distance vector AC (313-1), distance vector BC (313-2), etc.) onto the respective norm vectors (e.g., norm vector A (312-1), norm vector B (312-2), etc.) for the point C (311-3) are positive, the signed distance from the point C (311-3) to the surface segment (310) has a positive sign. In contrast, the projections of the distance vectors (e.g., distance vector AD (313-3), etc.) onto the respective norm vectors (e.g., norm vector A (312-1)) are negative for the point D (311-4). Therefore, the signed distance from the point DC (311-4) to the surface segment (310) has a negative sign. Based on the signed distances, the point C (311-3) and point D (311-4) are determined to be on opposite sides of the surface segment (310).

An example of computing norm vectors of a surface segment and computing the signed distance as an implicit function in the volume of interest is described in the sections 1, 2, and 3 of the pseudo code listed in TABLE 1 below.

FIGS. 3.2, 3.3, and 3.4 show example schematic diagrams of two surface segments in three relationship scenarios. In particular, the volume of interest and the associated grid are omitted in FIGS. 3.2, 3.3, and 3.4 for clarity.

FIG. 3.2 shows an example schematic diagram of a surface segment A (321) and a surface segment B (322) that have no relation. Specifically, having no relation refers to (i) points of the surface segment A (321) are in one side to the surface segment B (322) based on the signed distance and (ii) points of the surface segment B (322) are in one side to the surface segment A (321) based on the signed distance.

FIG. 3.3 shows an example schematic diagram of a surface segment C (331) that truncates a surface segment D (332). Specifically, the truncating relation refers to (i) the truncating surface segment (i.e., surface segment C (331)) includes points on both sides to the truncated surface segment (i.e., surface segment D (332)) based on the signed distance and (ii) points of the truncated surface segment (i.e., surface segment D (332)) are on one side of the truncating surface segment (i.e., surface segment C (331)) based on the signed distance.

In addition, FIG. 3.3 shows another example schematic diagram of a surface segment E (333) that truncates a surface segment F (334). Specifically, the truncating relation refers to (i) the truncating surface segment (i.e., surface segment E (333)) includes points on both sides to the truncated surface segment (i.e., surface segment F (334)) based on the signed distance and (ii) points of the truncated surface segment (i.e., surface segment F (334)) are on one side of the truncating surface segment (i.e., surface segment E (333)) based on the signed distance.

FIG. 3.4 shows an example schematic diagram of a surface segment G (341) that intersects a surface segment H (342). Specifically, the intersecting relation refers to (i) the surface segment G (341) includes points on both sides to the surface segment H (342)) based on the signed distance and (ii) the surface segment H (342) includes points on both sides to the surface segment G (341)) based on the signed distance.

FIG. 3.5 shows an example schematic diagram of extending the surface segment D (332) that is truncated by the surface segment C (331), as depicted in FIG. 3.3 above. Specifically, the surface segment D (332) is extended into an extended surface segment that includes the surface segment D (332) and an extension of the surface segment D (332). While the surface segment D (332) is shown as a solid segment, the extension is shown as two separate portions of dashed segments, i.e., the valid portion A (332-1) and the invalid portion A (332-2). In particular, the valid portion A (332-1) and the surface segment D (332) are in the same side of the surface segment C (331). In contrast, the invalid portion A (332-2) and the surface segment D (332) are in the opposite sides of the surface segment C (331).

In addition, FIG. 3.5 shows another example schematic diagram of extending the surface segment F (334) that is truncated by the surface segment E (333), as depicted in FIG. 3.3 above. Specifically, the surface segment F (334) is extended into an extended surface segment that includes the surface segment F (334) and an extension of the surface segment F (334). While the surface segment F (334) is shown as a solid segment, the extension is shown as two separate portions of dashed segments, i.e., the valid portion B (334-1) and the invalid portion B (334-2). In particular, the valid portion B (334-1) and the surface segment F (334) are in the same side of the surface segment E (333). In contrast, the invalid portion B (334-2) and the surface segment F (334) are in the opposite sides of the surface segment E (333).

Extending the surface segment and identifying the invalid portion of the extension, as described herein, corresponds to the section 3 of the pseudo code listed in TABLE 1 below.

FIG. 3.6 shows an example schematic diagram of a volume of interest with draft segmentation (360-1) and a volume of interest with final segmentation (360-2). In the volume of interest with draft segmentation (360-1), a surface segment I (361) is initially identified (e.g., based on a user input) as a truncated surface segment that is truncated by a surface segment II (362). In contrast, the surface segment II (362) and a surface segment III (363) are identified (e.g., based on a user input) as intersecting surface segments with respect to each other. As noted above, each of the surface segment I (361), surface segment II (362), and surface segment III (363) is extended to include extensions (shown as dash line segments). The volume of interest with draft segmentation (360-1) is divided by the surface segment I (361), surface segment II (362), surface segment III (363), and their extensions into multiple compartments, such as the compartment 1 (364-1), compartment 2 (364-2), compartment 3 (364-3), compartment 4 (364-4), compartment 5 (364-5), and compartment 6 (364-6). Based on being identified as a truncated surface segment, a portion (i.e., extension C (361-3)) in the extension of the surface segment I (361) is determined to be invalid. Because the compartment 5 (364-5) and compartment 6 (364-6) share the invalid extension C (361-3) as a common boundary, the compartment 5 (364-5) and compartment 6 (364-6) are merged into a single merged compartment by removing the invalid extension C (361-3).

The volume of interest with final segmentation (360-2) and the volume of interest with draft segmentation (360-1) correspond to the same region in the subterranean formation and are different versions of a modeled representation of the region. In particular, the volume of interest with final segmentation (360-2) is generated from the volume of interest with draft segmentation (360-1) using the method described in reference to FIGS. 2.1 and 2.2 above. Specifically, the compartment 5 (364-5) and compartment 6 (364-6) in the volume of interest with draft segmentation (360-1) are replaced by a merged compartment (364-7) in the volume of interest with final segmentation (360-2). In contrast to excluding the invalid extension C (361-3) of the truncated surface segment I (361) from the volume of interest with final segmentation (360-2), extensions of the surface segment II (362) and surface segment III (363) are determined to be valid based on the intersecting relation and remain in the volume of interest with final segmentation (360-2).

FIG. 3.7 shows an example 3D view of a volume of interest (370) and a corresponding segmented volume of interest (370-1). The volume of interest (370) includes a surface segment A (371), a surface segment B (372), a surface segment C (373), a surface segment E (375), a surface segment F (376), and a surface segment G (377) that are specified by a user as being truncated by a surface segment D (374). In other words, the surface segment D (374) is specified as the truncating surface segment to each of the surface segment A (371), surface segment B (372), surface segment C (373), surface segment E (375), surface segment F (376), and surface segment G (377), which are the truncated surface segments in the truncating relations. Further, the user specifies the surface segment E (375) as being truncated by the surface segment G (377). In addition, the user specifies the surface segment E (375) and the surface segment F (376) as intersecting each other.

The segmented volume of interest (370-1) is generated from the volume of interest (370) using the method described in reference to FIGS. 2.1 and 2.2 above. Based on the truncating relations, the extension of each of the surface segment A (371), surface segment B (372), surface segment C (373), surface segment E (375), surface segment F (376), and surface segment G (377) into the opposite side of the surface segment D (374) is determined as invalid and excluded from the segmented volume of interest (370-1). Similarly, the extension (not shown) of the surface segment E (375) into the opposite side of the surface segment G (377) is determined as invalid and excluded from the segmented volume of interest (370-1). As a result of removing this invalid extension (not shown), a single merged compartment (379) is formed on the left side of the surface segment G (377). In contrast, the extension (375-1) of the surface segment E (375) into the opposite side of the surface segment F (376) is determined as valid and remains in the segmented volume of interest (370-1). As a result, the compartment I (378-1) and compartment IV (378-4) are formed on the right side of the surface segment G (377) and divided by the extension (375-1).

Embodiments of structural volume segmentation may be implemented on a computing system. Any combination of mobile, desktop, server, router, switch, embedded device, or other types of hardware may be used. For example, as shown in FIG. 4.1, the computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), and numerous other elements and functionalities.

The computer processor(s) (402) may be an integrated circuit for processing instructions. For example, the computer processor(s) may be one or more cores or micro-cores of a processor. The computing system (400) may also include one or more input devices (410), such as a touchscreen, keyboard, mouse, microphone, touchpad, electronic pen, or any other type of input device.

The communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

Further, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments.

The computing system (400) in FIG. 4.1 may be connected to or be a part of a network. For example, as shown in FIG. 4.2, the network (420) may include multiple nodes (e.g., node X (422), node Y (424)). Each node may correspond to a computing system, such as the computing system shown in FIG. 4.1, or a group of nodes combined may correspond to the computing system shown in FIG. 4.1. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (400) may be located at a remote location and connected to the other elements over a network.

Although not shown in FIG. 4.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system shown in FIG. 4.1. Further, the client device (426) may include and/or perform at least a portion of one or more embodiments.

The computing system or group of computing systems described in FIGS. 4.1 and 4.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope. The processes may be part of the same or different application and may execute on the same or different computing system.

Rather than or in addition to sharing data between processes, the computing system performing one or more embodiments may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments, may extract one or more data items from the obtained data. For example, the extraction may be performed as follows by the computing system in FIG. 4.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 4.1, while performing one or more embodiments, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 4.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 4.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present a few examples of functions performed by the computing system of FIG. 4.1 and the nodes and/or client device in FIG. 4.2. Other functions may be performed using one or more embodiments.

The systems and methods provided relate to the acquisition of hydrocarbons from an oilfield. It will be appreciated that the same systems and methods may be used for performing subsurface operations, such as mining, water retrieval, and acquisition of other underground fluids or other geomaterials from other fields. Further, portions of the systems and methods may be implemented as software, hardware, firmware, or combinations thereof.

While one or more embodiments have been described with respect to a limited number of embodiments, those skilled in the art, having benefit of this disclosure, will appreciate that other embodiments may be devised which do not depart from the scope as disclosed herein. Accordingly, the scope should be limited by the attached claims.

What is claimed is:

1. A method for performing a field operation of a field, comprising:

identifying, inside a volume of interest representing a portion of the field, that a first surface segment is truncated by a second surface segment, wherein each of the first surface segment and the second surface segment corresponds to a geological feature in the field;

generating, based at least on a first implicit function, an extended first surface segment comprising the first surface segment and a first extension of the first surface segment, wherein the first implicit function is generated based on a distance gradient that maps points in the volume of interest to a signed distance to the first surface segment, and the first extension of the first surface segment is an addition to an incomplete surface segment generated based on the signed distance;

generating a plurality of compartments by dividing the volume of interest using at least the extended first surface segment and the second surface segment;

merging, based on a common boundary of at least two compartments of the plurality of compartments being within a first portion of the extended first surface segment, the at least two compartments into a single merged compartment; and performing, based at least on the single merged compartment, modeling of the field to generate a modeling result.

2. The method of claim 1, wherein generating the extended first surface segment comprises:

determining, using the first implicit function, a first signed distance of a point in the volume of interest; and including the point in the extended first surface segment if the first signed distance of the point is zero.

3. The method of claim 2, further comprising:

determining a norm vector for at least one point of the first surface segment, wherein the norm vector is perpendicular to the first surface segment at the at least one point; and generating, for the point in the volume of interest, the first signed distance based at least on the norm vector and a distance vector from the at least one point to the point.

4. The method of claim 2, further comprising:

generating, based at least on a second implicit function, an extended second surface segment comprising the second surface segment and a second extension of the second surface segment, wherein the volume of interest is divided into the plurality of compartments by using at least the extended second surface segment and the extended first surface segment.

5. The method of claim 4, further comprising:

generating, using the second implicit function and for each point of the extended first surface segment, a second signed distance to the second surface segment; and dividing, based on the second signed distance, the extended first surface segment into a second portion and the first portion, wherein the second portion and the first portion are associated with opposite signs of the second signed distance.

6. The method of claim 1, further comprising:

receiving measurements of the field to generate the second surface segment and the first surface segment, wherein the measurements are associated with the geological feature; and receiving an indication that the second surface segment truncates the first surface segment.

7. The method of claim 1, further comprising:

generating a control signal based on the modeling result; and performing the field operation based on the control signal.

8. A non-transitory computer readable medium storing instructions to carry out the method according to claim 1.

9. A system for performing a field operation of a field, comprising:

an exploration and production (E&P) Computer system, comprising:

a computer processor;

memory storing instructions executed by the Computer processor, wherein the instructions comprise functionality to:

identify, inside a volume of interest representing a portion of the field, that a first surface segment is truncated by a second surface segment, wherein each of the first surface segment and the second surface segment corresponds to at least a portion of a geological feature in the portion of the field;

generate, based at least on a first implicit function, an extended first surface segment comprising the first surface segment and a first extension of the first surface segment, wherein the first implicit function is generated based on a distance gradient that maps points in the volume of interest to a signed distance to the first surface segment, and the first extension of the first surface segment is an addition to an incomplete surface segment generated based on the signed distance;

generate a plurality of compartments by dividing the volume of interest using at least the extended first surface segment and the second surface segment;

merge, based on a common boundary of at least two compartments of the plurality of compartments being within a first portion of the extended first surface segment, the at least two compartments into a single merged compartment; and perform, based at least on the single merged compartment, modeling of the field to generate a modeling result; and a repository for storing the first surface segment, the second surface segment, and the single merged compartment.

10. The system of claim 9, wherein generating the extended first surface segment comprises:

determining, using the first implicit function, a first signed distance of a point in the volume of interest; and including the point in the extended first surface segment if the first signed distance of the point is zero.

11. The system of claim 10, wherein the instructions further comprise functionality to: determine a norm vector for at least one point of the first surface segment, wherein the norm vector is perpendicular to the first surface segment at the at least one point; and generate, for the point in the volume of interest, the first signed distance based at least on the norm vector and a distance vector from the at least one point to the point.

12. The system of claim 9, wherein the instructions further comprise functionality to: generate, based at least on a second implicit function, an extended second surface segment comprising the second surface segment and a second extension of the second surface segment, wherein the volume of interest is divided into the plurality of compartments by using at least the extended second surface segment and the extended first surface segment.

13. The system of claim 12, wherein the instructions further comprise functionality to: generate, using the second implicit function and for each point of the extended first surface segment, a second signed distance to the second surface segment, and
divide, based on the second signed distance, the extended first surface segment into a second portion and the first portion,
wherein the valid portion and the invalid portion are associated with opposite signs of the second signed distance.

14. The system of claim 9, wherein the instructions further comprise functionality to: receive an indication that the second surface segment truncates the first surface segment.

15. The system of claim 9, further comprising:
a sensory device configured to receive measurements of the field to generate the second surface segment and the first surface segment, wherein the measurements are associated with the geological feature;
field equipment coupled to the E&P Computer system and configured to perform the field operation based on a control signal,
wherein the instructions further comprise functionality to generate the control signal based on the modeling result.

* * * * *